(12) United States Patent
Bresie

(10) Patent No.: US 8,448,432 B2
(45) Date of Patent: May 28, 2013

(54) ACTUATORS

(75) Inventor: Don Bresie, Round Rock, TX (US)

(73) Assignee: The Board of Regents of the University of Texas System, Austin, TX (US)

(*) Notice: Subject to any disclaimer, the term of this patent is extended or adjusted under 35 U.S.C. 154(b) by 1088 days.

(21) Appl. No.: 11/674,600

(22) Filed: Feb. 13, 2007

(65) Prior Publication Data
US 2008/0190104 A1 Aug. 14, 2008

(51) Int. Cl.
*F16D 31/02* (2006.01)
*F01B 3/10* (2006.01)

(52) U.S. Cl.
USPC .................. 60/476; 60/414; 92/113

(58) Field of Classification Search
USPC ............... 60/414, 475, 476; 92/110, 113
See application file for complete search history.

(56) References Cited

U.S. PATENT DOCUMENTS

| | | | | |
|---|---|---|---|---|
| 2,457,467 A | 12/1948 | Hartman | | 60/475 |
| 2,746,251 A | 5/1956 | Ashton | | 60/434 |
| 2,755,779 A | 7/1956 | Muller | | 91/422 |
| 2,944,400 A | 7/1960 | Ashton | | 60/470 |
| 3,855,791 A | 12/1974 | Quinto | | 60/380 |
| 3,979,910 A | 9/1976 | Leuenberger et al. | | 60/476 |
| 4,144,980 A | * | 3/1979 | Meyer | 414/725 |
| 4,291,872 A | 9/1981 | Brilando et al. | | 482/57 |
| 5,020,826 A | 6/1991 | Stecklein et al. | | 280/124.159 |
| 5,097,916 A | 3/1992 | Brandstadter | | 180/9.1 |
| 5,144,801 A | 9/1992 | Scanderbeg et al. | | 60/475 |
| 5,163,659 A | 11/1992 | Lizell | | 267/64.16 |
| 5,329,767 A | * | 7/1994 | Hewett | 60/475 |
| 5,519,995 A | * | 5/1996 | Sasse et al. | 60/476 |
| 5,941,508 A | 8/1999 | Murata et al. | | 267/64.17 |
| 6,126,401 A | 10/2000 | Latham | | 417/16 |
| 6,282,893 B1 | 9/2001 | Porter et al. | | 60/477 |
| 6,474,629 B2 | 11/2002 | Beck et al. | | 267/64.16 |
| 6,494,441 B2 | 12/2002 | Beck et al. | | 267/64.16 |
| 6,516,706 B2 | 2/2003 | Porter et al. | | 91/420 |
| 6,530,220 B2 | 3/2003 | Porter et al. | | 60/478 |
| 6,543,223 B2 | * | 4/2003 | Muschong et al. | 60/476 |
| 6,796,120 B2 | * | 9/2004 | Franchet et al. | 60/475 |
| 2005/0173182 A1 | 8/2005 | Yokota et al. | | 180/441 |

FOREIGN PATENT DOCUMENTS

| | | |
|---|---|---|
| EP | 1158181 | 11/2001 |
| EP | 1 306 560 | 5/2003 |
| WO | WO 2005/059372 | 6/2005 |

OTHER PUBLICATIONS

"Active or adaptive suspension? Automobile suspensions," *Automotive Industries*, Jun. 1994.
"Electronic chassis control," *Automotive Industries*, Aug. 1, 1999.
"Ford kills active-suspension program: costly components shelved for now," *Automotive News*, Jan. 23, 1995.
PCT International Search Report and Written Opinion, issued in International Application No. PCT/US2008/053499, dated Jul. 4, 2008.

* cited by examiner

*Primary Examiner* — Michael Leslie
(74) *Attorney, Agent, or Firm* — Fulbright & Jaworski L.L.P.

(57) ABSTRACT

Actuators suited for use with, for example, vehicular suspension systems. In some embodiments, the present actuators include a reversible hydraulic pump configured to produce variable hydraulic pressure; a hydraulic cylinder assembly having a cylinder bore, and a piston positioned within the cylinder bore that is axially movable relative to the cylinder bore; and a hydraulic circuit hydraulically coupling the reversible hydraulic pump to the hydraulic cylinder assembly. In these embodiments, actuated axial motion of the piston relative to the cylinder bore is accomplished without the use of check valves, pressure regulating valves, or actively controlled valves.

22 Claims, 10 Drawing Sheets

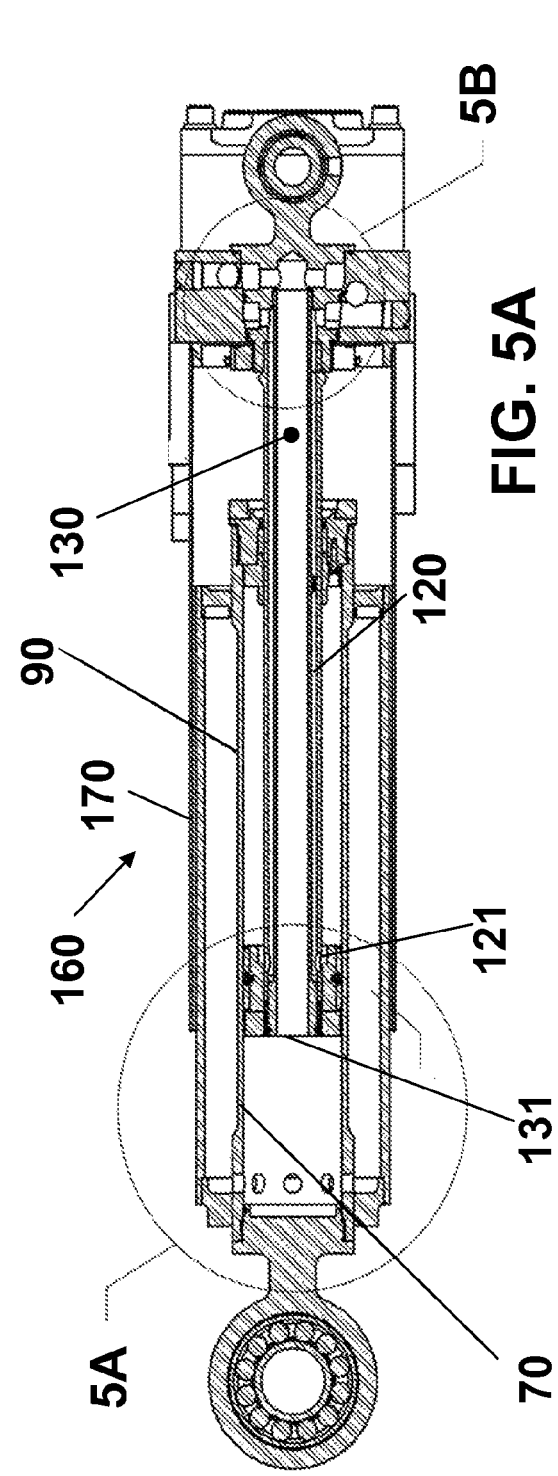
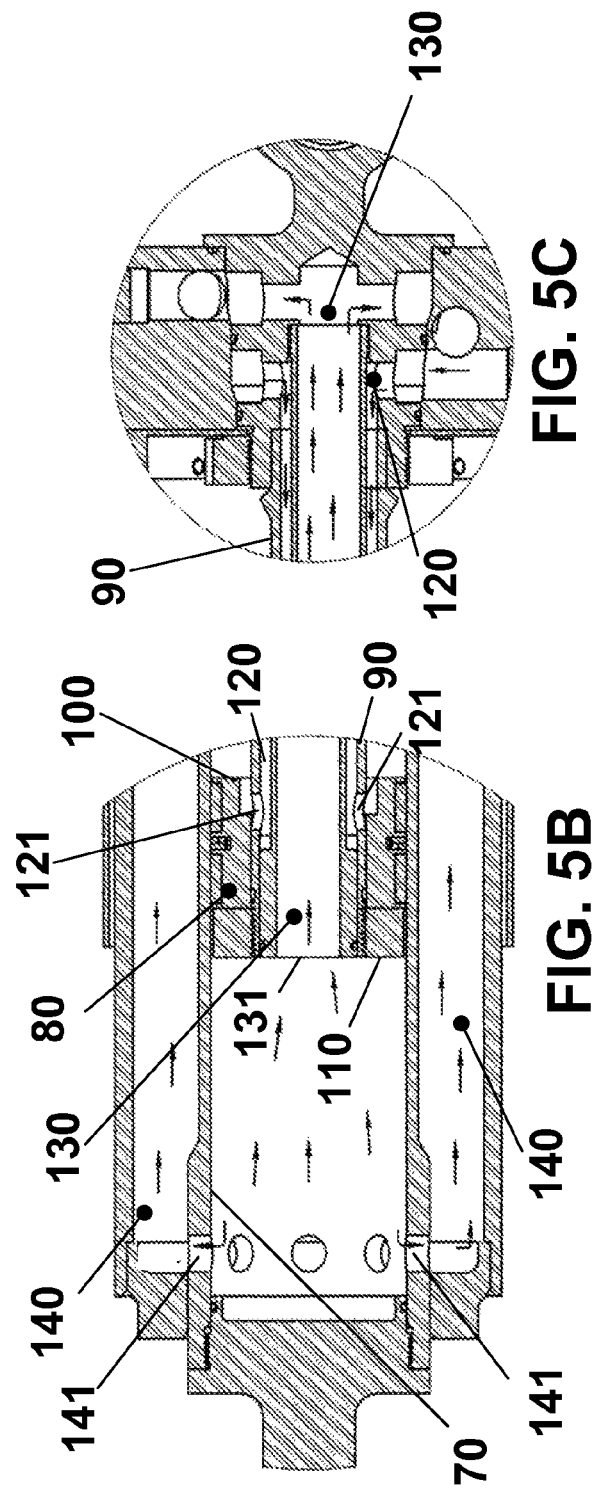
FIG. 5A
FIG. 5B
FIG. 5C

ACTUATORS

BACKGROUND

1. Field

The present invention relates generally to actuators, and more particularly to hydraulic actuator devices suited for use in land vehicle suspension systems.

2. Description of Related Art

The use of servo actuators to control motion in land vehicle suspension systems offers the potential for improving performance, especially for off road application. For example, developers of military vehicles have been particularly interested in this technology to enable faster movement of military vehicles over rough battlefield terrain. Active suspension systems provide a smoother ride and greater maneuvering stability in both off-road and on-road vehicles than passive suspension systems.

Linear electromechanical actuators have been employed in active suspension system designs. Typical linear electromechanical actuators for active suspension systems consist of a rotary electric motor, an efficient means of providing mechanical advantage and converting rotary motion to linear motion, and a means of controlling the torque of the motor. For example, in one example of an active suspension electro-mechanical actuator, the mechanical advantage is a set of reduction gears and a rack and pinion pair to convert the rotary electromechanical torque to linear force. Typically, the linear actuator is supplemented by a passive spring (steel coil, air, or other) to support vehicle static weight. Although this combination rack and pinion based electromechanical actuator and supplemental spring works well, it is relatively long (poor ratio of actuator stroke to actuator length). This makes the rack and pinion actuator difficult to integrate into existing land vehicle suspension systems.

An alternate design approach utilizes hydraulic servo systems. Typical hydraulic servo systems have an electric motor, a hydraulic pump, a fluid reservoir, servo valves, flow passages, a hydraulic cylinder, and an array of pressure sensors and limit switches to control motion. This arrangement generally provides a good range of motion and can be configured to operate in all four control quadrants. The servo valve throttles the flow of fluid to control cylinder force, and in its best form controls fluid flow rate to the cylinder in a proportional manner by partially opening or throttling. In four quadrant systems, four-way servo valves are used to direct hydraulic pressure to one side of the cylinder and to vent the other side to the fluid reservoir. This arrangement is satisfactory in systems where motion is intermittent and where duty cycle is relatively low, such as construction equipment. In systems with high duty cycles, the conventional servo system offers low efficiency due to two major sources of losses. The first source of energy loss is in the servo valve, where throttling action is lossy, reducing pressure by dissipating energy. The second source of energy loss is in supply pressure regulation, typically accomplished by bleeding off or bypassing some of the flow to the reservoir to control the output pressure from the hydraulic pump. In systems where energy efficiency is important, pressure regulation is accomplished with a variable displacement hydraulic pump. However, this increased efficiency is at the expense of size, complexity and cost.

SUMMARY

Embodiments of the present actuators are well-suited for use in an active suspension system for off-road or on-road vehicles. In some embodiments, the present actuators include, consist of, or consist essentially of a reversible hydraulic pump configured to produce variable hydraulic pressure; a hydraulic cylinder assembly comprising a cylinder bore and a piston positioned within the cylinder bore that is axially movable relative to the cylinder bore; and a hydraulic circuit hydraulically coupling the reversible hydraulic pump to the hydraulic cylinder assembly. In these embodiments, actuated axial motion of the piston relative to the cylinder bore is accomplished without the use of check valves, pressure regulating valves, or actively controlled valves. Land vehicles may employ some of these embodiments in a suspension system.

Some embodiments of the present actuator may include a servomechanism coupled to the reversible hydraulic pump. In some embodiments, the actuator is configured such that the reversible hydraulic pump is back drivable. Some embodiments may include as part of the hydraulic circuit a fixed-volume hydraulic accumulator that is at least partially filled with a compressible gas being held at a pressure greater than or equal to ambient pressure. Land vehicles may employ some of these embodiments in a suspension system.

In some embodiments, the reversible hydraulic pump, the hydraulic cylinder assembly, and the hydraulic circuit are structurally integrated as a modular unit that has an outer surface. Some embodiments also include a fixed-volume hydraulic accumulator that is structurally integrated as part of the modular unit. In some of these embodiments, actuated axial motion of the piston relative to the cylinder bore of the actuator requires no hydraulic communication with any component external to the outer surface of the modular unit. Land vehicles may employ some of these embodiments in a suspension system.

In other embodiments, the present actuators include, consist of, or consist essentially of a reversible motor configured to produce variable torque; a hydraulic transducer that is coupled to the reversible motor and has a first port and a second port; a hydraulic cylinder assembly comprising a cylinder bore, a piston positioned within the cylinder bore that is axially movable relative to the cylinder bore and has a rod-end side and a cylinder-end side, and a piston rod connected to the piston at the rod-end side of the piston; a first flow conduit hydraulically coupling the first port of the hydraulic transducer to the rod-end side of the piston; a second flow conduit hydraulically coupling the second port of the hydraulic transducer to the cylinder-end side of the piston; and a hydraulic accumulator hydraulically coupled to the cylinder-end side of the piston. In these embodiments, actuated axial motion of the piston relative to the cylinder bore is accomplished without the use of check valves, pressure regulating valves, or actively controlled valves. Land vehicles may employ some of these embodiments in a suspension system.

Some embodiments of the present actuator may include a reversible electric motor capable of variable torque. Some embodiments may include a servo amplifier electrically coupled to the reversible electric motor. In some embodiments, the actuator may be configured such that the reversible electric motor is back drivable. In some embodiments, the hydraulic accumulator may have a fixed volume that is at least partially filled with a compressible gas being held at a pressure greater than or equal to ambient pressure. Land vehicles may employ some of these embodiments in a suspension system.

In some embodiments, the reversible motor, the hydraulic transducer, the hydraulic cylinder assembly, the first flow conduit, and the second flow conduit are structurally integrated as a modular unit that has an outer surface. In some embodiments, the first flow conduit and the second flow conduit are routed within the piston rod and have no hydraulic tubing routed external to the outer surface of the modular unit. In some of these embodiments, actuated axial motion of the piston relative to the cylinder bore of the actuator requires no hydraulic communication with any component external to the outer surface of the modular unit. Land vehicles may employ some of these embodiments in a suspension system.

Some embodiments of the actuator may be configured to provide full four-quadrant operation, whereby the actuator can produce force in each of the two directions of travel, and do so either in support of, or in resistance to, the actuator direction of travel.

Details associated with the embodiments described above and others are presented below. Other embodiments of the present actuators are possible.

BRIEF DESCRIPTION OF THE DRAWINGS

The following drawings illustrate by way of example and not limitation. They are drawn to scale (in terms of proportions). Identical reference numerals do not necessarily indicate an identical structure. Rather, the same reference numeral may be used to indicate a similar feature or a feature with similar functionality. Not every feature of each embodiment is labeled in every figure in which that embodiment appears, in order to keep the figures clear.

FIG. 5A is a cross-sectional view of the actuator shown in FIG. 1 and taken at plane 5-5 of FIG. 1.

FIGS. 5B-5C are partial cross-sectional views showing additional detail of the cross-sectional view shown in FIG. 5A. Hydraulic fluid flow paths and examples of hydraulic fluid flow direction are illustrated.

DESCRIPTION OF ILLUSTRATIVE EMBODIMENTS

The terms "comprise" (and any form of comprise, such as "comprises" and "comprising"), "have" (and any form of have, such as "has" and "having"), "contain" (and any form of contain, such as "contains" and "containing"), and "include" (and any form of include, such as "includes" and "including") are open-ended linking verbs. As a result, a system or method that "comprises," "has," "contains," or "includes" one or more elements possesses those one or more elements, but is not limited to possessing only those one or more elements or steps. Likewise, an element of a system or method that "comprises," "has," "contains," or "includes" one or more features possesses those one or more features, but is not limited to possessing only those one or more features. Furthermore, a structure that is configured in a certain way must be configured in at least that way, but also may be configured in a way or ways that are not specified.

The terms "a" and "an" are defined as one or more than one unless this disclosure explicitly requires otherwise. The terms "substantially" and "about" are defined as at least close to (and includes) a given value or state (preferably within 10% of, more preferably within 1% of, and most preferably within 0.1% of). Metric units may be derived from the English units provided by applying a conversion and rounding to the nearest millimeter.

Figure 1:
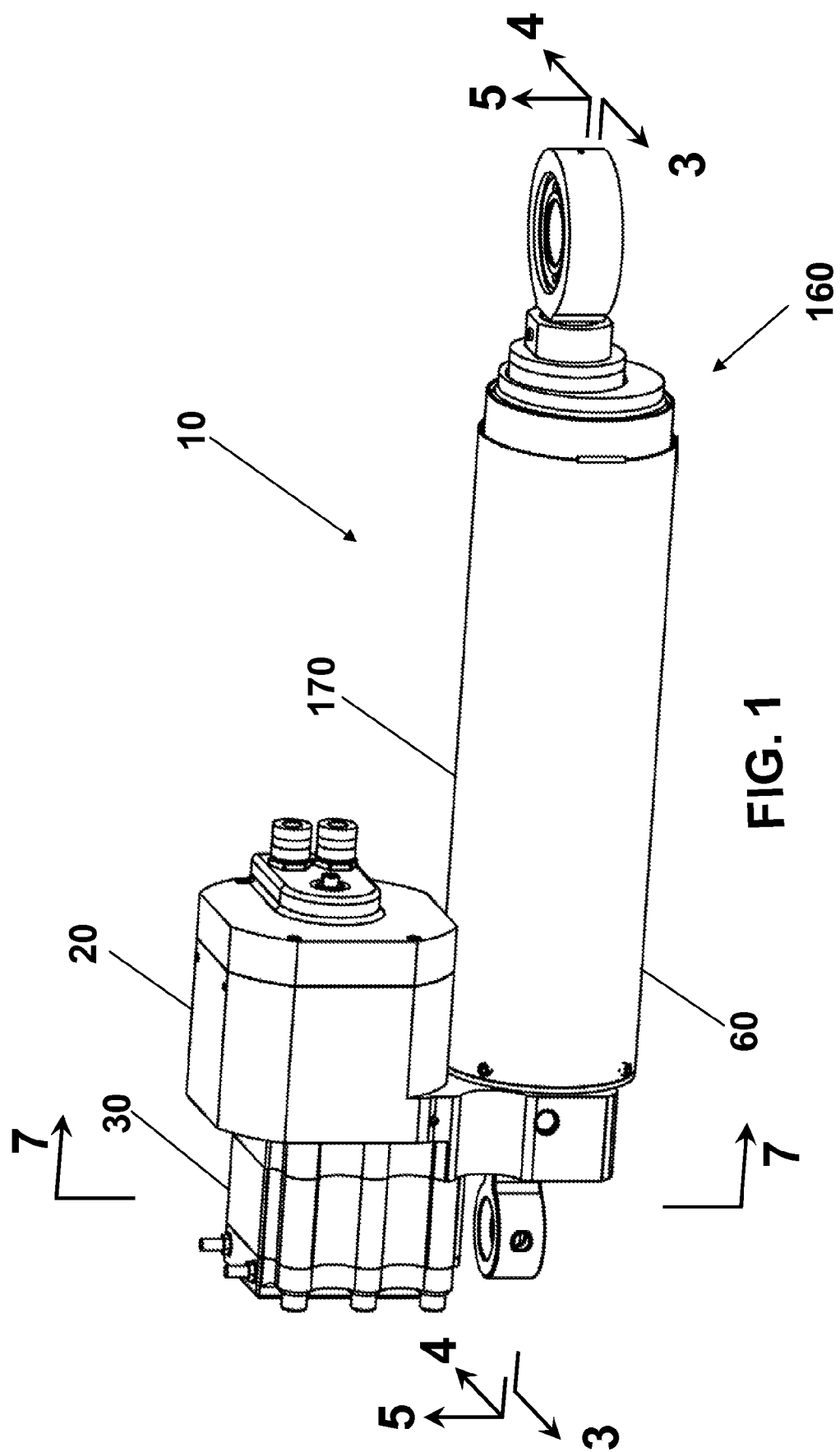
FIG. 1 is a perspective view of one embodiment of the present actuators.

A preferred embodiment of the present actuator appears in perspective in FIG. 1. Actuator 10 includes hydraulic cylinder assembly 60, reversible motor 20 capable of variable torque, and hydraulic transducer 30.

Figure 2:
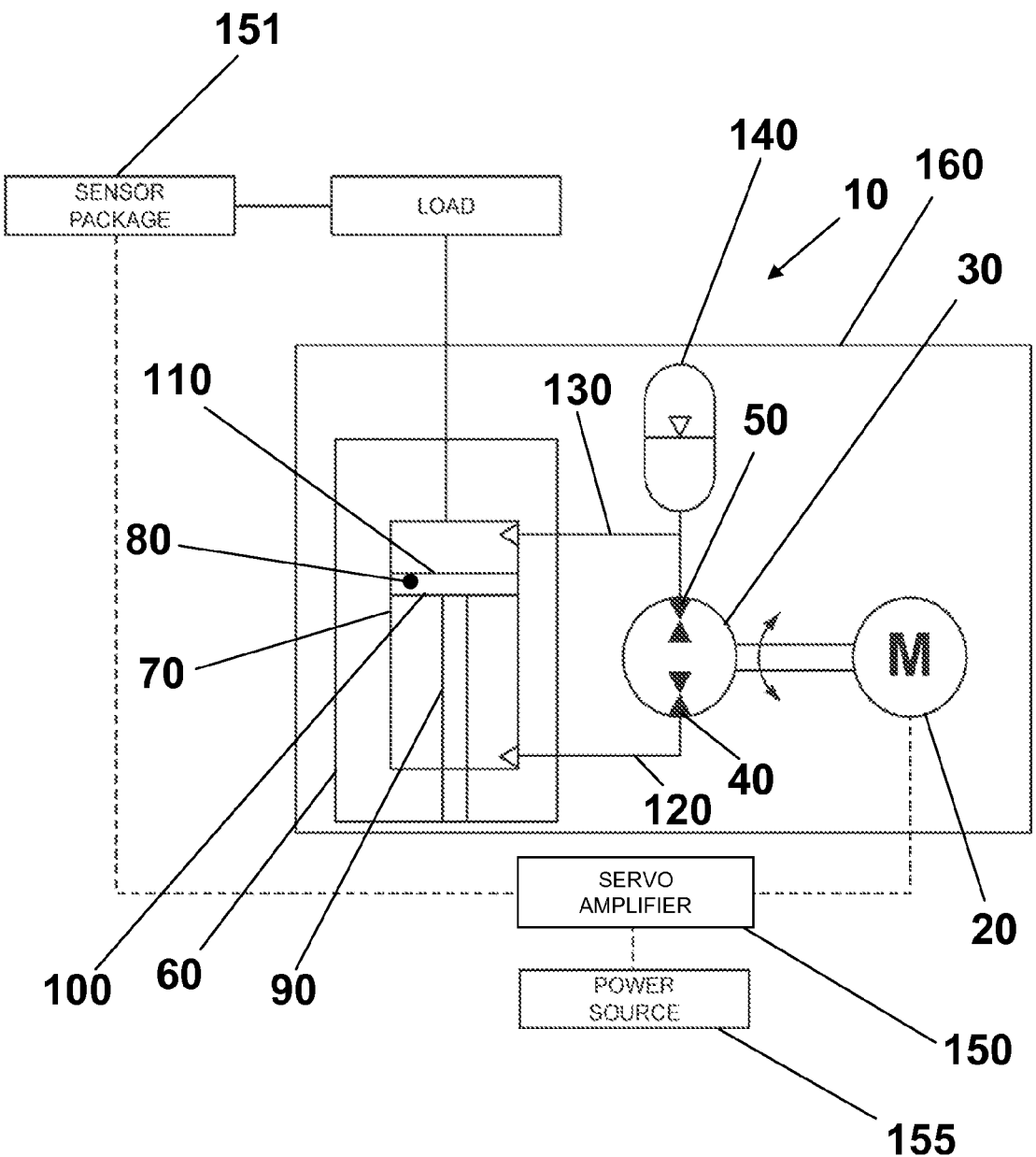
FIG. 2 is a schematic view of the actuator shown in FIG. 1.
Figure 9:
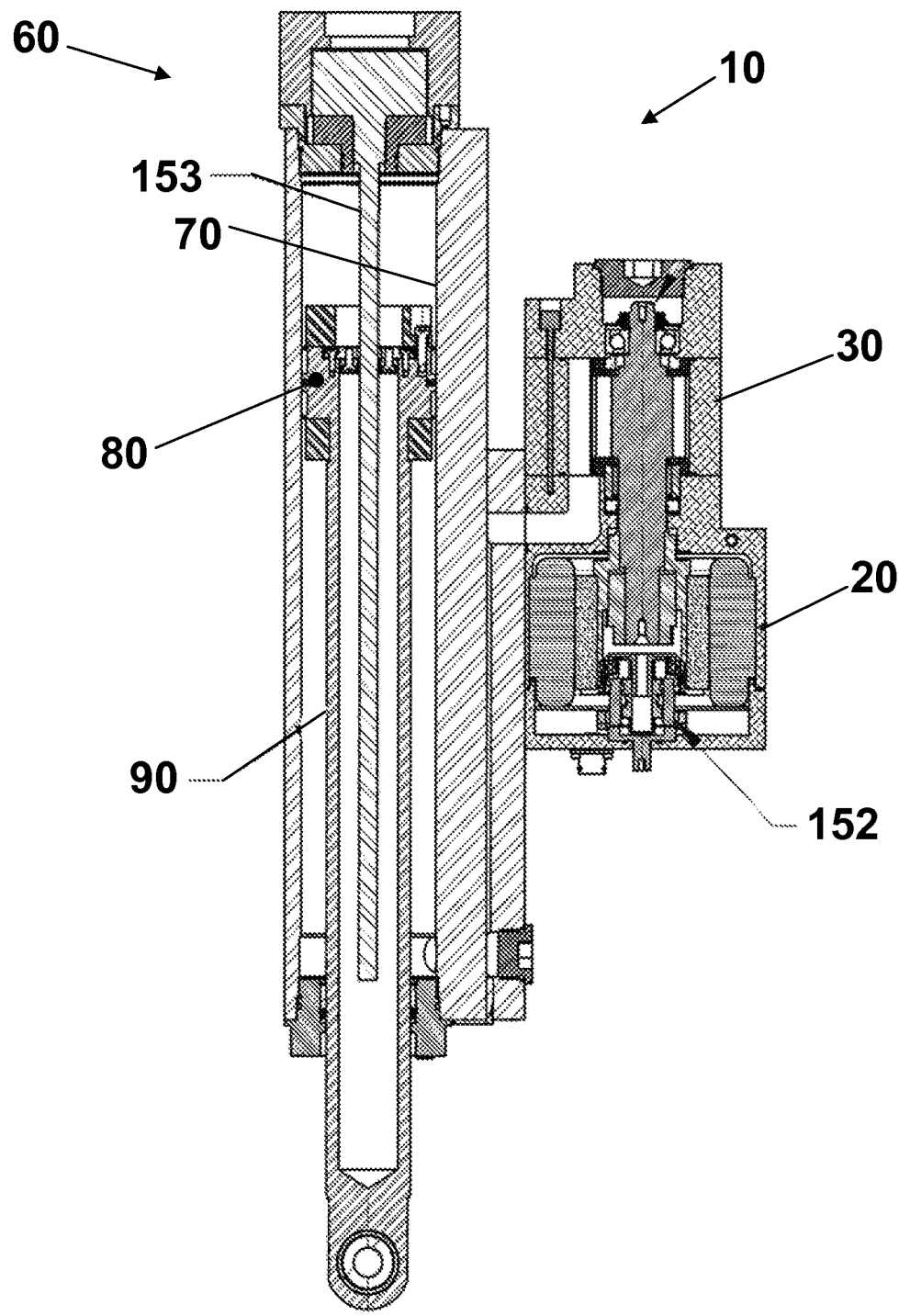
FIG. 9 is a cross-sectional view of an embodiment of the present actuators illustrating possible placement of a resolver and a linear variable displacement transducer.

Reversible motor 20 of the actuator 10 is a reversible electric motor capable of variable torque, which my be driven by a servo amplifier. For example, the schematic diagram of FIG. 2 shows servo amplifier 150 electrically coupled to reversible motor 20. In this embodiment, servo amplifier 150 provides a command signal for reversible motor 20 based on information from sensor package 151. One of ordinary skill in the art will recognize that the sensor package may include few or numerous measurement devices, such as force transducers, pressure transducers, linear variable displacement transducers, and resolvers. FIG. 9 is a cross-sectional view of an alternate embodiment of actuator 10 showing an example of a resolver 152 configured to measure the rotation of hydraulic transducer 30, and a linear variable displacement transducer 153 configured to measure relative linear motion between piston 80 and cylinder bore 70.

Figure 7:
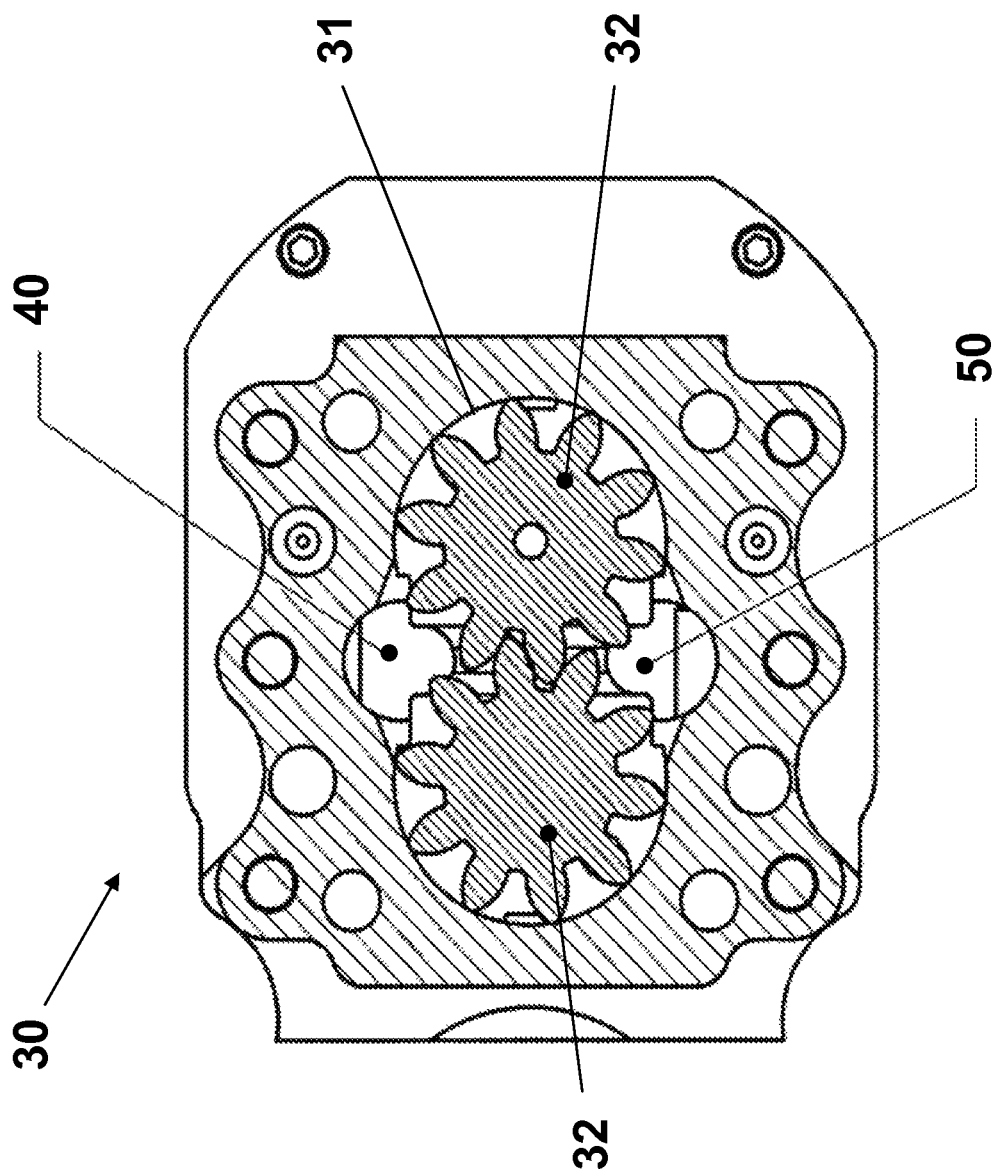
FIG. 7 is a cross-sectional view of the actuator shown in FIG. 1 and taken at plane 7-7 of FIG. 1. The hydraulic transducer, a gear pump in this embodiment, is shown.

Hydraulic transducer 30 of the preferred embodiment is gear pump 31 having first port 40, second port 50, and two spur gears 32 as illustrated in FIG. 7. In alternate embodiments, the hydraulic transducer may be any hydraulic transducer capable of bi-directional operation. "Bi-directional" operation with respect to the hydraulic transducer is defined as the ability to increase fluid pressure in at least two directions through the hydraulic transducer and to increase fluid flow rate in at least two directions through the hydraulic transducer. For example, in FIG. 7, rotational motion of spur gears 32 in a specific direction will result in hydraulic fluid flow away from gear pump 31 through the hydraulic transducer's first port 40 and to gear pump 31 through the hydraulic transducer's second port 50. Rotational motion of spur gears 32 of gear pump 31 in the opposite direction will result in hydraulic fluid flow to gear pump 31 through first port 40 and away from the gear pump 31 through second port 50. Similarly, torque applied to spur gears 32 in a specific direction will result in an increase in fluid pressure to first port 40, whereas torque applied to spur gears 32 in the opposite direction will result in an increase in fluid pressure to second port 50.

Returning to the schematic diagram of FIG. 2, hydraulic transducer 30 is coupled to reversible motor 20, thereby allowing the transfer of energy between these two components. This coupling may be achieved through direct mechanical contact of the components, mechanical contact of the components through intermediate components, magnetic coupling, or other methods of energy transfer.

Hydraulic transducer 30 is hydraulically coupled to components of hydraulic cylinder assembly 60. "Hydraulic coupling" of components means that the components are in hydraulic communication with each other, either directly or through other components.

One of ordinary skill in the art will recognize that the coupling of hydraulic transducer 30 with reversible motor 20 configured to produce variable torque, combined with the hydraulic coupling of hydraulic transducer 30 with hydraulic cylinder assembly 60, will result in a structure that can act as a reversible hydraulic pump capable of producing variable hydraulic pressure. Other embodiments may include other reversible hydraulic pump designs that are configured to produce variable hydraulic pressure. The reversible hydraulic pump may be coupled to a servomechanism to facilitate motion control.

Reversible motor 20 and hydraulic transducer 30 may be configured such that reversible motor 20 is back drivable. "Back drivable" denotes that energy can flow from the motor (or back drivable pump in alternate embodiments) to the cylinder assembly (e.g., hydraulic cylinder assembly 60) or vice versa. When hydraulic energy flows from the cylinder assembly to the motor (or pump), the motor (or pump) functions as a generator that can provide energy that can be stored or used by other components. For example, in the preferred embodiment shown in FIG. 2, hydraulic energy from cylinder assembly 60 may enter hydraulic transducer 30, which can then convert it to mechanical rotational energy. Back drivable reversible electric motor 20, which is coupled to hydraulic transducer 30, acts as a generator and converts the mechanical rotational energy to electrical energy (regeneration). The regenerated electrical energy can be stored or used by supporting power source 155. Servo amplifier 150 of a back drivable actuator is designed to allow energy to flow in both directions.

One of ordinary skill in the art will understand that embodiments of the present actuators may include a servomechanism, reversible motor, and hydraulic transducer configured such that the actuator is capable of four-quadrant operation. Four-quadrant operation exists when the actuator is capable of controlled operation in all four control quadrants. The preferred embodiment of the present actuators is capable of four-quadrant operation.

Figure 3:
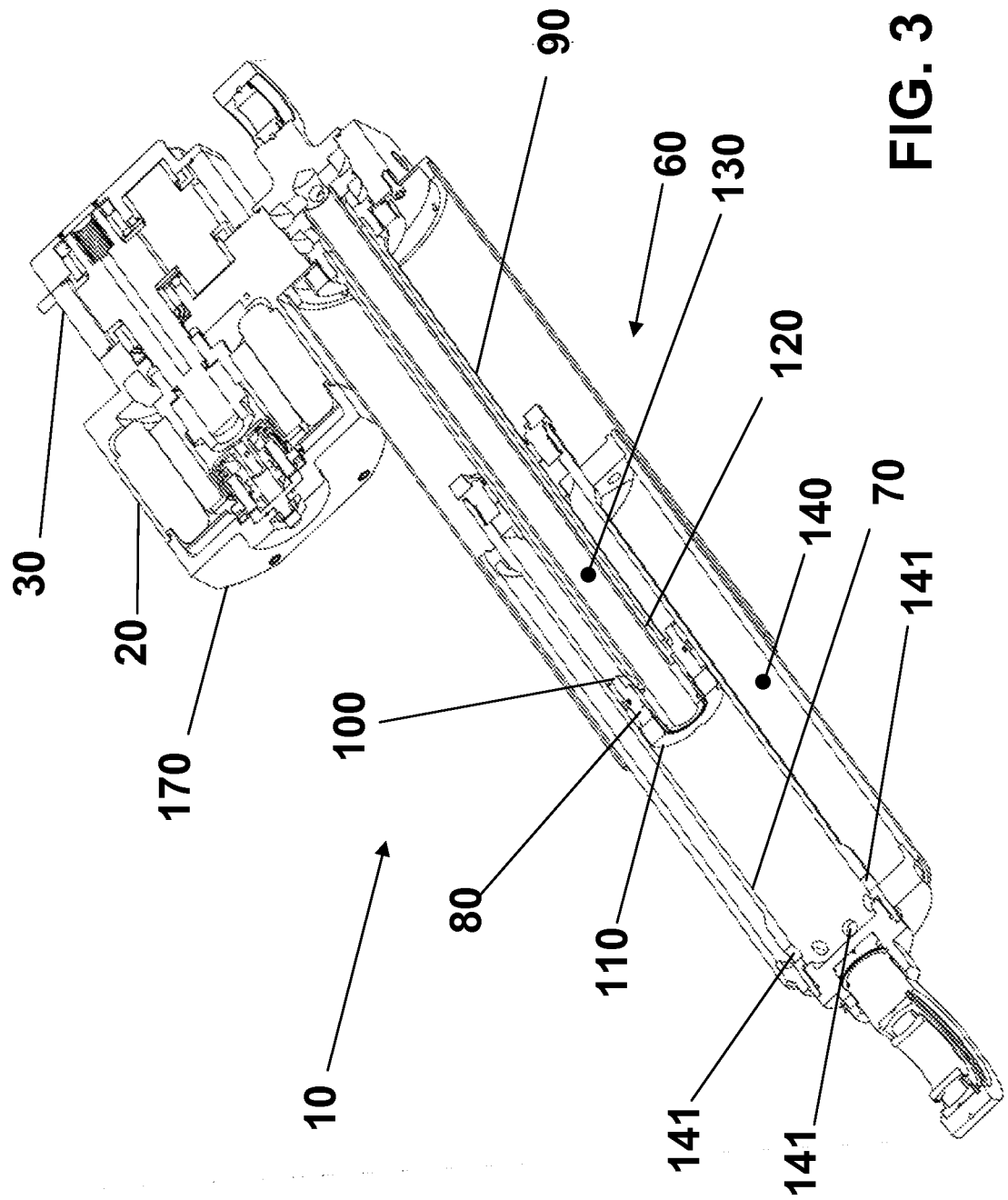
FIG. 3 is a perspective cross-sectional view of the actuator shown in FIG. 1 and taken at plane 3-3 of FIG. 1.
Figure 4:
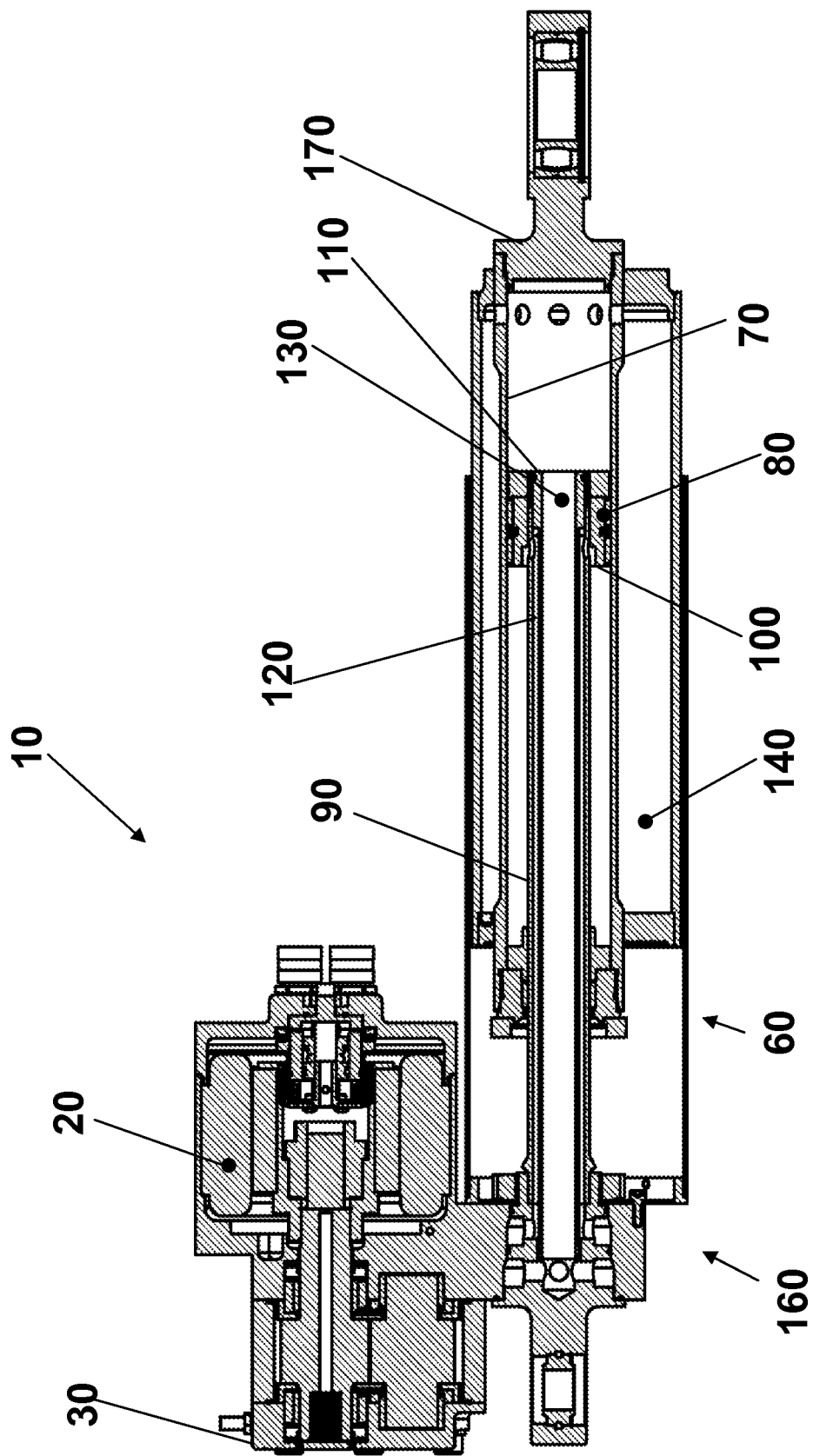
FIG. 4 is a cross-sectional view of the actuator shown in FIG. 1 and taken at plane 4-4 of FIG. 1.
Figure 6:
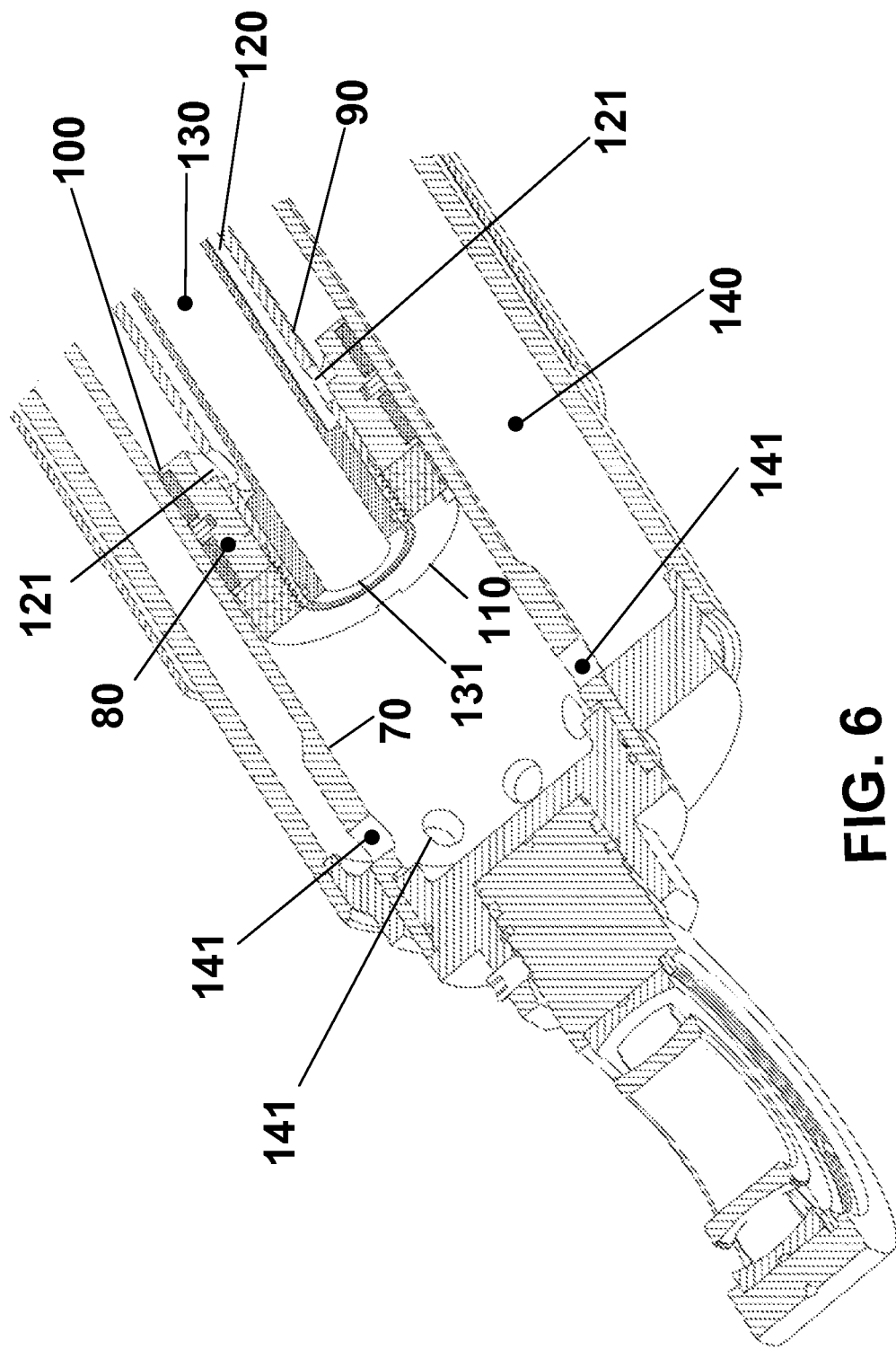
FIG. 6 is a partial perspective cross-sectional view showing the piston, cylinder bore, and accumulator of the actuator shown in FIG. 1.

FIGS. 3-4 are cross-sectional views showing additional detail of hydraulic cylinder assembly 60. Hydraulic cylinder assembly 60 comprises cylinder bore 70, piston 80 positioned within cylinder bore 70, and piston rod 90. Piston 80 is axially movable relative to cylinder bore 70. Piston 80 has rod-end side 100 and an opposite cylinder-end side 110. Piston rod 90 is connected to piston 80 at rod-end side 100. Within cylinder bore 70 is a hydraulic fluid-filled volume that is divided by piston 80.

Hydraulic cylinder assembly 60 and its included components shown in FIG. 3 have circular cross sections when viewed from a plane normal to their longitudinal axis. Other embodiments may have components that have non-circular cross-sectional shapes. For example, the cylinder bore may be rectangular, hexagonal, triangular, or irregularly shaped in cross section. The cylinder bore cross section may be any shape that allows for a piston to be positioned within the cylinder bore and axially movable relative to the cylinder bore. Likewise, the piston can be any suitable shape that satisfies this relationship between cylinder bore and piston. The piston rod may be any structure, or combination of structures, that connects to the rod-end side of the piston and fixes the piston to other components. The piston rod may have any suitable cross-sectional shape.

A hydraulic circuit hydraulically couples hydraulic transducer (or reversible hydraulic pump) 30 to hydraulic cylinder assembly 60. An example of a suitable hydraulic circuit is shown schematically in FIG. 2, where first flow conduit 120 hydraulically couples first port 40 of hydraulic transducer 30 to rod-end side 100 of piston 80, second flow conduit 130 hydraulically couples second port 50 of the hydraulic transducer 30 to the cylinder-end side 110 of piston 80, and hydraulic accumulator 140 is hydraulically coupled to hydraulic cylinder assembly 60 such that the accumulator is in hydraulic communication with the cylinder-end side 110 of piston 80. As a result of using such a hydraulic circuit, rod-end side 100 of piston 80 is in hydraulic communication with first port 40 of hydraulic transducer 30, and cylinder-end side 110 of the piston 80 is in hydraulic communication with second port 50 of the hydraulic transducer 30 and hydraulic accumulator 140. In alternate embodiments, the hydraulic accumulator may be hydraulically coupled to the hydraulic cylinder assembly at a different location, such as being configured such that the hydraulic accumulator is in hydraulic communication with the rod-end side 100 of piston 80.

Hydraulic accumulator 140 compensates for hydraulic fluid volume variation within cylinder bore 70, which variation is piston-location dependent. This variation results from volume occupied by piston rod 90. For example, in the depicted embodiment, an actuator position that places a minimum piston rod volume within the cylinder bore results in maximum hydraulic fluid volume within the cylinder bore, whereas an actuator position that places a maximum piston rod volume within the cylinder bore results in minimum hydraulic fluid volume within the cylinder bore. Hydraulically coupling hydraulic accumulator 140 to hydraulic cylinder assembly 60 allows hydraulic fluid to enter and exit cylinder bore 70 as required to compensate for cylinder bore fluid volume changes. Although the preferred embodiment utilizes a hydraulic accumulator, alternate embodiments may include no hydraulic accumulator. Persons or ordinary skill in the art will recognize that embodiments with two piston rods (one connected to each side of the piston) do not have fluid volume variation that is piston-location dependent.

Figure 10:
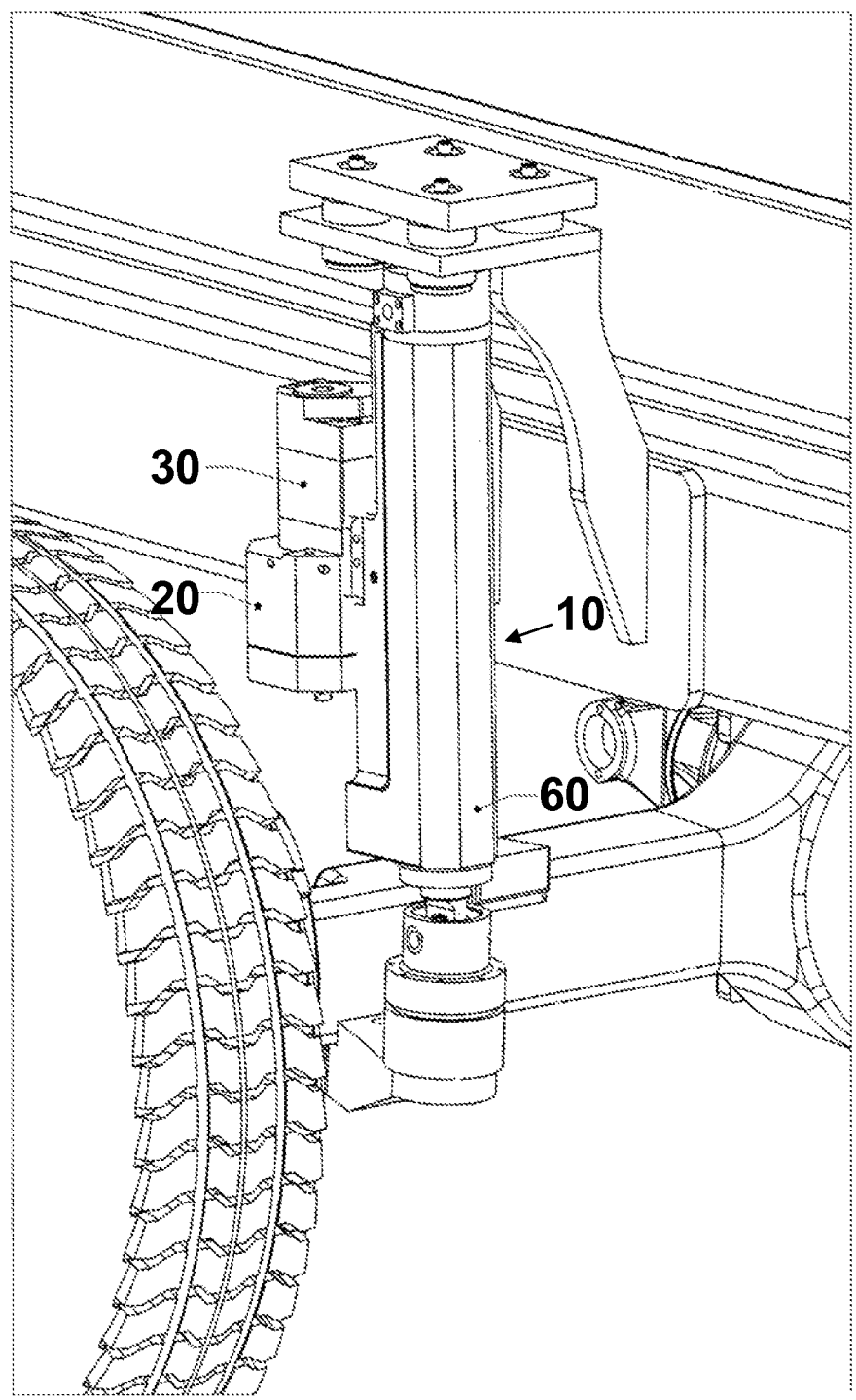
FIG. 10 is a perspective view of an embodiment of the present actuators employed in a suspension system of a land vehicle.

FIG. 3 illustrates that the preferred embodiment has a fixed-volume hydraulic accumulator 140. The fixed-volume hydraulic accumulator may be partially filled with a compressible gas at a pressure greater than ambient. This pressurization of the fixed-volume accumulator results in variable hydraulic pressure within the actuator, even when reversible motor 20 and hydraulic transducer 30 (or reversible hydraulic pump in alternate embodiments) is inactive. The variable hydraulic pressure is dependent on the position of the piston, thus creating a passive air spring. The passive air spring is a desirable characteristic for some applications of embodiments of the present actuators. For example, the preferred embodiment for implementation of the actuator in an active suspension system for land vehicles (illustrated in FIG. 10) utilizes a fixed-volume hydraulic accumulator partially filled with a compressible gas at positive pressure.

Continuing with the preferred embodiment shown in FIG. 3, fixed-volume hydraulic accumulator 140 is integrated with hydraulic cylinder assembly 60. However, alternate embodiments may include a hydraulic accumulator located differently, or no hydraulic accumulator. Other embodiments may include a hydraulic accumulator having variable volume.

FIGS. 5A-5C and 6 illustrate the preferred embodiment's hydraulic circuit configuration, which routes first flow conduit 120 and second flow conduit 130 through piston rod 90. Both flow conduits (120, 130) comprise portions that are routed axially along the length of piston rod 90. Second flow conduit 130 comprises a circular passage routed through the center of the piston rod 90, intersecting the cylinder-end side 110 of piston 80 at opening 131. First flow conduit 120 comprises an annular passage concentric with second flow conduit 130. First flow conduit 120 is in hydraulic communication with the rod-end side 100 of piston 80 via multiple openings 121 located on the radial surface of piston rod 90. Multiple openings 141 located radially on the cylinder bore facilitate hydraulic communication between cylinder-end side 110 of piston 80 and hydraulic accumulator 140. This preferred embodiment illustrates one efficient and compact configuration for the hydraulic circuit. Other routings, either through the piston rod or otherwise, will be recognized by one of skill in the art.

The preferred embodiment of the present actuators depicted in FIG. 1 is a modular unit 160, having outer surface 170. "Modular unit" is defined as a component or group of components having a common outer surface. The "outer surface" may be one or more surfaces depending on the geometry of the modular unit, and must form one continuous closed volume. The definition of "outer surface" does not include cabling or tubing. Components that are "structurally integrated" as part of a modular unit are either located within the outer surface of the modular unit, or are part of the outer surface. Elements that are said to be "part of" a modular unit, or "structurally integrated as" a modular unit, denote an open-ended listing of elements of the modular unit. Other non-listed elements may also be members of the modular unit.

Figure 8:
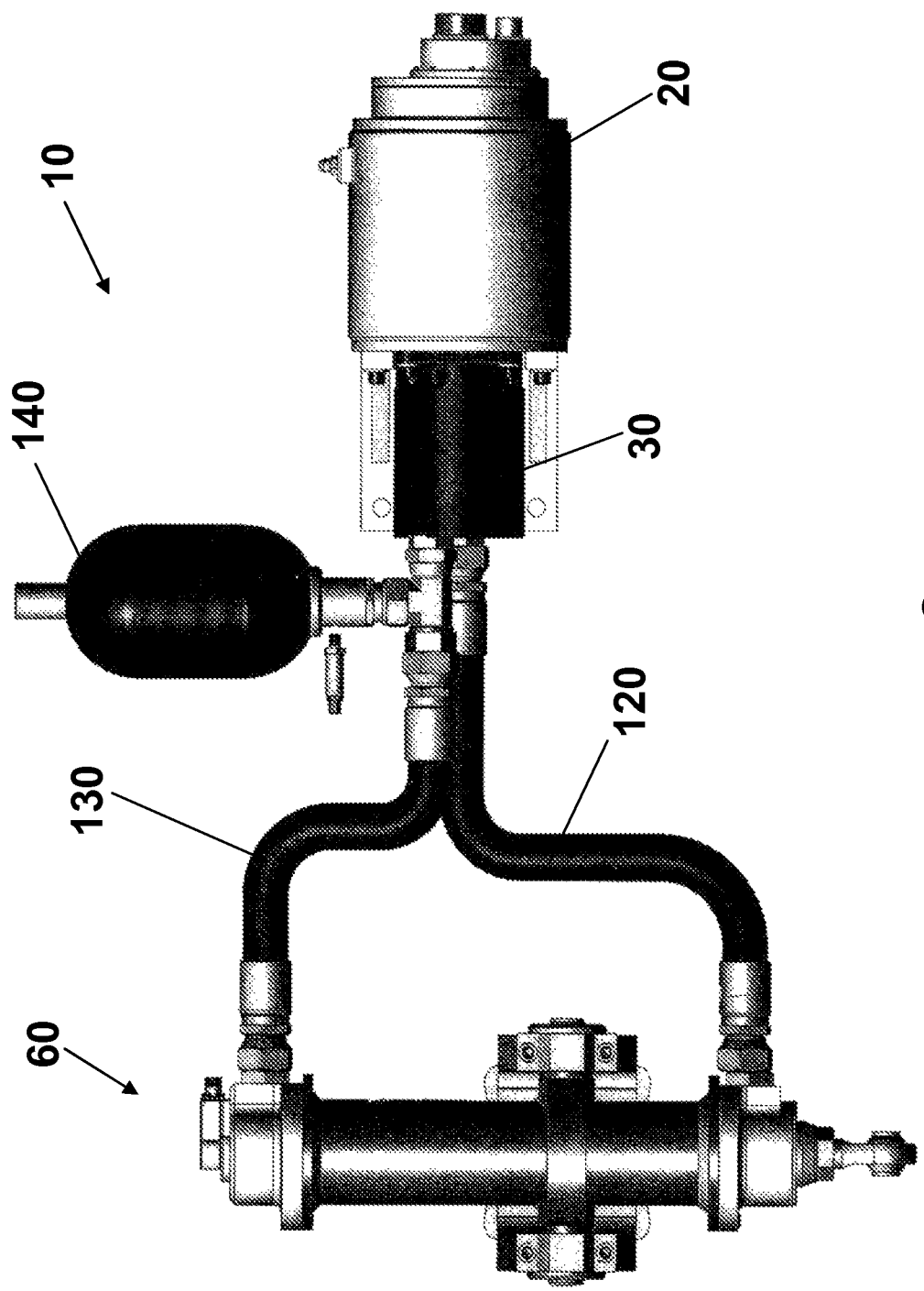
FIG. 8 is a front view of an embodiment of the present actuators that does not have the hydraulic accumulator, hydraulic transducer, or reversible motor structurally integrated with the cylinder assembly.

Referring to FIG. 4, all hydraulic circuit elements are structurally integrated as part of modular unit 160. In the preferred embodiment, reversible motor 20, hydraulic transducer 30, hydraulic cylinder assembly 60, hydraulic accumulator 140, first flow conduit 120, and second flow conduit 130 are structurally integrated as modular unit 160. The preferred embodiment comprises no hydraulic tubing routed external to outer surface 170 of modular unit 160, and no hydraulic communication occurs between components within modular unit 160 and any component external to modular unit 160. Alternate embodiments may include a reversible hydraulic pump, hydraulic cylinder assembly, and hydraulic circuit structurally integrated as a modular unit. In other alternate embodiments, components may be not structurally integrated as a modular unit. FIG. 8 illustrates an embodiment of the actuator where reversible motor 20, hydraulic transducer 30, hydraulic accumulator 140, and hydraulic cylinder 60 are not structurally integrated as a modular unit, as no common outer surface exists.

Referring to FIGS. 2-3, an example of actuated motion of the preferred embodiment of the present actuators involves reversible motor 20 turning hydraulic transducer 30 in response to a current applied by the servo amplifier 150. This current can be any value up to the maximum allowed by the motor, and can be in either direction. The turning of hydraulic transducer 30 creates a pressure differential between first port 40 of hydraulic transducer 30 and second port 50 of the hydraulic transducer 30. As a result of the portion of the hydraulic circuit (flow conduits 120, 130) coupling hydraulic transducer 30 to hydraulic cylinder assembly 60, a pressure differential is created across piston 80. The pressure differential creates force on piston 80, which is independent of the direction of the piston velocity and dependent only on the direction of the motor current. As piston 80 moves in the axial direction relative to cylinder bore 70, hydraulic fluid flows between the volume within the cylinder bore 70 and accumulator 140 to compensate for piston rod displacement.

The preferred embodiment of the present actuators accomplishes actuated motion without using any valves. Valve operation is required only during the initial or maintenance filling of the actuator with hydraulic fluid. The preferred embodiment is controlled by modulating motor torque to modulate the output force of the actuator, rather than by controlling fluid flow with servo-valves (as is typical of hydraulic actuators). Actuated motion of the piston relative to the cylinder bore is accomplished without the use of any check valves, pressure regulating valves, or actively controlled valves. The absence of valves reduces complexity, reduces cost, increases reliability, and improves performance.

It should be understood that the present actuators are not intended to be limited to the particular forms disclosed. Rather, they are to cover all modifications, equivalents, and alternatives falling within the scope of the claims. For example, although the present actuators have been illustrated and described as working well in land vehicle suspension systems, those of ordinary skill in the art will understand that the present actuators can efficiently and reliably transmit large amounts force in a short response time, and accordingly are suited to many applications, such as compact, high-efficiency actuators for use in aircraft control systems, weapons pointing systems, robotics, and precision machining equipment.

Furthermore, although the components of hydraulic cylinder assembly 60 of the preferred embodiment have been shown as being cylindrically shaped, the components may be of any shape. Additionally, while reversible motor 20 of the preferred embodiment is an electric motor, any type of reversible motor may be used, and need not be a rotational motor. Also, the coupling of reversible motor 20 to hydraulic transducer 30 of the preferred embodiment need not be a direct mechanical coupling. Alternately, a reversible hydraulic pump that does not have a separately identifiable reversible motor and hydraulic transducer components may be used.

The claims are not to be interpreted as including means-plus- or step-plus-function limitations, unless such a limitation is explicitly recited in a given claim using the phrase(s) "means for" or "step for," respectively.

I claim:

1. An actuator comprising:
    a reversible hydraulic pump configured to produce variable hydraulic pressure;
    a hydraulic cylinder assembly that is not in line with the reversible hydraulic pump, the hydraulic cylinder assembly comprising:
        a cylinder bore; and
        a piston positioned within the cylinder bore, the piston being axially movable relative to the cylinder bore, and the piston having a rod-end side and a cylinder-end side;
    a hydraulic circuit hydraulically coupling the reversible hydraulic pump to the hydraulic cylinder assembly;
    wherein:
        the actuator is configured for four-quadrant operation, whereby the actuator can produce force in support of and in resistance to each of two directions of axial motion; and
        actuated axial motion of the piston relative to the cylinder bore is accomplished without the use of check valves, pressure regulating valves, or actively controlled valves.

2. The actuator of claim 1 further comprising a servo-mechanism coupled to the reversible hydraulic pump.

3. The actuator of claim 1 configured such that the reversible hydraulic pump is back drivable in two directions.

4. The actuator of claim 1, wherein:
    the reversible hydraulic pump, the hydraulic cylinder assembly, and the hydraulic circuit are structurally integrated as a modular unit;

the modular unit has an outer surface; and actuated axial motion of the piston relative to the cylinder bore of the actuator requires no hydraulic communication with any component external to the outer surface of the modular unit.

5. The actuator of claim 1, wherein:

the hydraulic circuit further comprises a fixed-volume hydraulic accumulator; and the fixed-volume hydraulic accumulator is at least partially filled with a compressible gas, the compressible gas being held in the fixed-volume hydraulic accumulator at a pressure greater than or equal to ambient pressure.

6. The actuator of claim 5, wherein:

the reversible hydraulic pump, the hydraulic cylinder assembly, the hydraulic circuit, and the fixed-volume hydraulic accumulator are structurally integrated as a modular unit;

the modular unit has an outer surface; and actuated axial motion of the piston relative to the cylinder bore of the actuator requires no hydraulic communication with any component external to the outer surface of the modular unit.

7. The actuator of claim 6, further comprising a servo-mechanism coupled to the reversible hydraulic pump, and wherein the actuator is configured such that the reversible hydraulic pump is back drivable in two directions.

8. A land vehicle equipped with the actuator of claim 1.

9. A land vehicle equipped with the actuator of claim 6.

10. A land vehicle equipped with the actuator of claim 7.

11. An actuator comprising:

a reversible motor configured to produce variable torque;

a hydraulic transducer coupled to the reversible motor, the hydraulic transducer having a first port and a second port;

a hydraulic cylinder assembly that is not in line with the hydraulic transducer, the hydraulic cylinder assembly comprising:
  a cylinder bore;
  a piston positioned within the cylinder bore, the piston being axially movable relative to the cylinder bore, and the piston having a rod-end side and a cylinder-end side; and
  a piston rod connected to the piston at the rod-end side of the piston;

a first flow conduit hydraulically coupling the first port of the hydraulic transducer to the rod-end side of the piston;

a second flow conduit hydraulically coupling the second port of the hydraulic transducer to the cylinder-end side of the piston; and a hydraulic accumulator hydraulically coupled to the hydraulic cylinder assembly;

wherein:
  the actuator is configured for four-quadrant operation, whereby the actuator can produce force in support of and in resistance to each of two directions of axial motion; and
  actuated axial motion of the piston relative to the cylinder bore is accomplished without the use of check valves, pressure regulating valves, or actively controlled valves.

12. The actuator of claim 11, wherein the reversible motor is a reversible electric motor configured to produce variable torque.

13. The actuator of claim 12 further comprising a servo amplifier electrically coupled to the reversible electric motor.

14. The actuator of claim 12 configured such that the reversible electric motor is back drivable in two directions.

15. The actuator of claim 11, wherein:

the reversible motor, the hydraulic transducer, the hydraulic cylinder assembly, the hydraulic accumulator, the first flow conduit, and the second flow conduit are structurally integrated as a modular unit;

the modular unit has an outer surface; and actuated axial motion of the piston relative to the cylinder bore of the actuator requires no hydraulic communication with any component external to the outer surface of the modular unit.

16. The actuator of claim 15, wherein the first flow conduit and the second flow conduit are routed within the piston rod, and the actuator comprises no hydraulic tubing that is routed external to the outer surface of the modular unit.

17. The actuator of claim 15, wherein the reversible motor is a reversible electric motor configured to produce variable torque.

18. The actuator of claim 11, wherein:

the hydraulic accumulator has a fixed volume; and the hydraulic accumulator is at least partially filled with a compressible gas, the compressible gas being held in the hydraulic accumulator at a pressure greater than or equal to ambient pressure.

19. The actuator of claim 17, further comprising a servo amplifier electrically coupled to the reversible motor, and wherein:

the actuator is configured such that the reversible electric motor is back drivable in two directions;

the hydraulic accumulator has a fixed volume; and the hydraulic accumulator is at least partially filled with a compressible gas, the compressible gas being held in the hydraulic accumulator at a pressure greater than or equal to ambient pressure.

20. A land vehicle equipped with the actuator of claim 11.

21. A land vehicle equipped with the actuator of claim 17.

22. A land vehicle equipped with the actuator of claim 19.

* * * * *

UNITED STATES PATENT AND TRADEMARK OFFICE
CERTIFICATE OF CORRECTION

| | | |
|---|---|---|
| PATENT NO. | : 8,448,432 B2 | Page 1 of 1 |
| APPLICATION NO. | : 11/674600 | |
| DATED | : May 28, 2013 | |
| INVENTOR(S) | : Don Bresie et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 494 days.

Signed and Sealed this
Twenty-third Day of December, 2014

Michelle K. Lee
*Deputy Director of the United States Patent and Trademark Office*